(12) United States Patent
Ingram

(10) Patent No.: US 8,240,167 B2
(45) Date of Patent: Aug. 14, 2012

(54) CRYOGENIC FREEZING APPARATUS

(76) Inventor: Michael T. Ingram, Wilmington, NC (US)

( * ) Notice: Subject to any disclaimer, the term of this patent is extended or adjusted under 35 U.S.C. 154(b) by 417 days.

(21) Appl. No.: 12/658,321

(22) Filed: Feb. 8, 2010

(65) Prior Publication Data

US 2011/0192185 A1    Aug. 11, 2011

(51) Int. Cl.
*F25D 23/12*    (2006.01)

(52) U.S. Cl. .......................................... 62/259.4; 62/293

(58) Field of Classification Search .................... 62/293, 62/64, 66, 135, 259.4; 138/97, 99; 285/41, 285/45, 373, 419, 420; 137/13; 165/104.11, 165/80.1, 169
See application file for complete search history.

(56) References Cited

U.S. PATENT DOCUMENTS

| | | | | |
|---|---|---|---|---|
| 3,550,638 A * | 12/1970 | Smith | ............................. | 138/99 |
| 3,742,723 A | 7/1973 | Grise | | |
| 3,917,424 A * | 11/1975 | Zugel | ............................. | 403/287 |
| 3,954,288 A * | 5/1976 | Smith | ............................. | 285/93 |
| 4,096,886 A * | 6/1978 | Daspit | ............................. | 138/99 |
| 4,111,234 A * | 9/1978 | Wells et al. | ............................. | 138/99 |
| 4,171,142 A * | 10/1979 | Harrison | ............................. | 285/10 |
| 4,267,699 A | 5/1981 | Bahrenburg | | |
| 4,364,417 A * | 12/1982 | Lefter | ............................. | 138/42 |
| 4,370,862 A | 2/1983 | Brister | | |
| 4,416,118 A | 11/1983 | Brister | | |
| 4,428,204 A * | 1/1984 | Brister | ............................. | 62/62 |
| 4,433,556 A | 2/1984 | Brady | | |
| 4,487,643 A * | 12/1984 | Ellett | ............................. | 156/80 |
| 4,644,975 A * | 2/1987 | Fricker | ............................. | 138/110 |
| 4,699,177 A * | 10/1987 | Thomas | ............................. | 138/103 |
| 4,709,729 A * | 12/1987 | Harrison | ............................. | 138/99 |
| 4,944,161 A | 7/1990 | Van Der Sanden | | |
| 5,137,305 A * | 8/1992 | Straub | ............................. | 285/112 |
| 5,269,568 A * | 12/1993 | Courturier | ............................. | 285/80 |
| 5,312,137 A * | 5/1994 | Nee | ............................. | 285/14 |
| 5,375,888 A * | 12/1994 | Ikeda | ............................. | 285/15 |
| 5,548,965 A | 8/1996 | Chen et al. | | |
| 5,608,159 A * | 3/1997 | Carcone et al. | ............................. | 73/49.8 |
| 5,680,770 A * | 10/1997 | Hall et al. | ............................. | 62/293 |
| 5,834,635 A * | 11/1998 | Preikschat et al. | ............................. | 73/53.01 |
| 5,836,167 A | 11/1998 | Clouston | | |
| 6,148,619 A | 11/2000 | Evans | | |
| 6,286,329 B1 | 9/2001 | Radichio | | |
| 6,408,638 B1 | 6/2002 | Chen | | |
| 6,434,952 B2 | 8/2002 | Wagner | | |
| 6,598,412 B1 | 7/2003 | Chen | | |
| 6,718,789 B1 | 4/2004 | Radichio | | |
| 7,168,452 B2 * | 1/2007 | Sasaki et al. | ............................. | 138/110 |
| 7,628,428 B2 * | 12/2009 | Rampton et al. | ............................. | 285/45 |

* cited by examiner

*Primary Examiner* — Mohammad Ali

(74) *Attorney, Agent, or Firm* — MacCord Mason PLLC

(57) ABSTRACT

A kit is described for use in freezing liquid within a first pipe of a given first diameter and a second pipe of a given second diameter less than the given first diameter. The kit includes a multi-section refrigerant chamber adapted for attachment around a pipe, the chamber having end mounting walls with openings having a diameter greater than the first given diameter; a pair of first adapter plates attachable to the outer faces of the end walls of the chamber sections, the first adapter plates having central pipe receiving openings with a diameter equal to the first given diameter; and a pair of second adapter plates attachable to the outer faces of the end walls of the chamber sections, the second adapter plates having central pipe receiving opening with a diameter equal to the second given diameter. A compressible gasket can be inserted between the chamber sections.

20 Claims, 4 Drawing Sheets

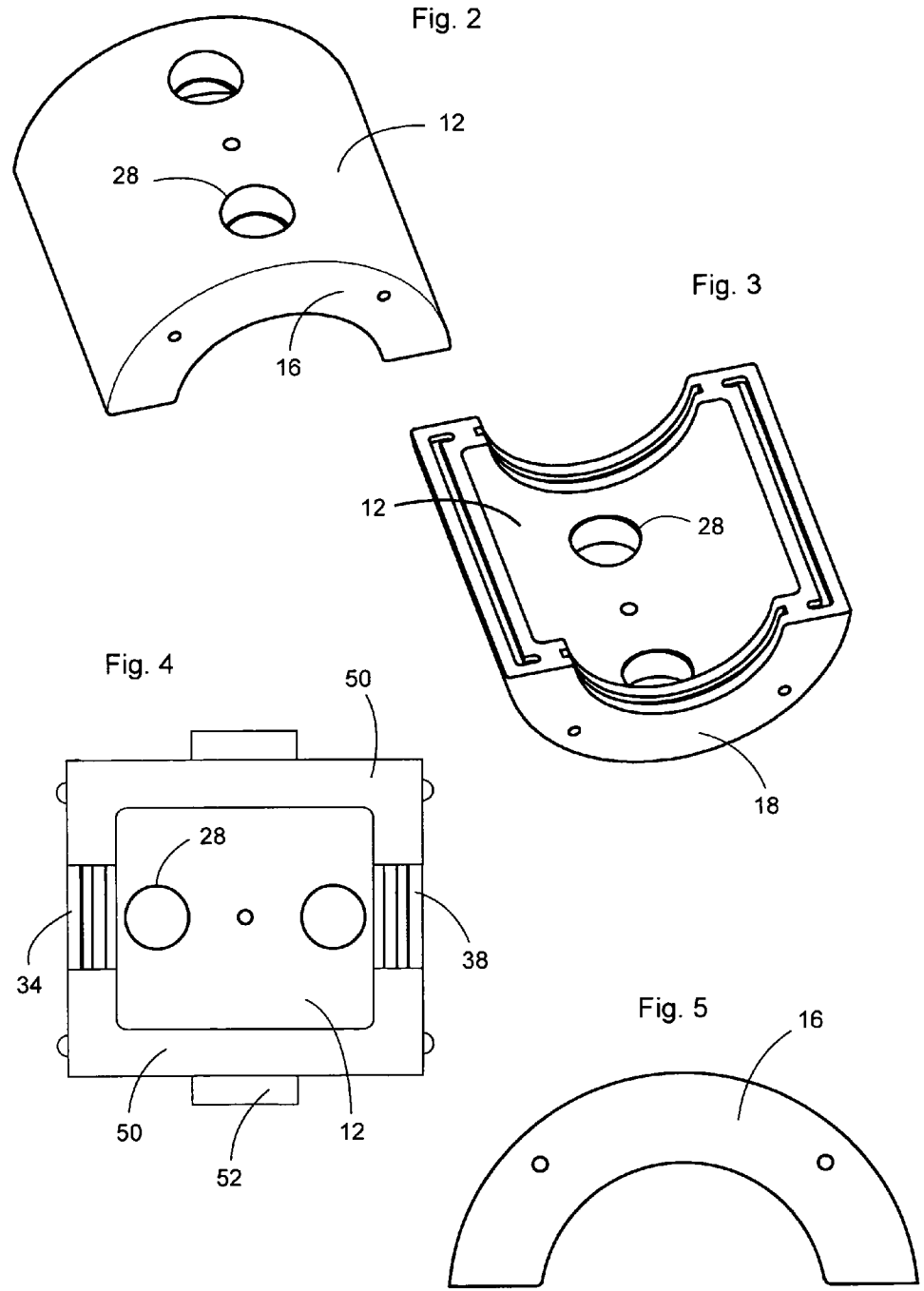

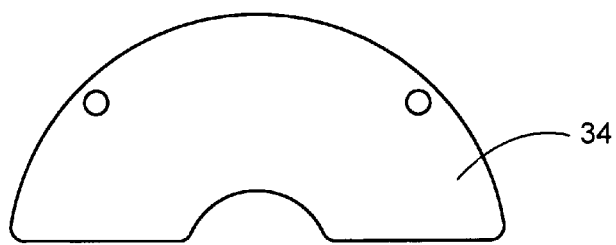
Fig. 6
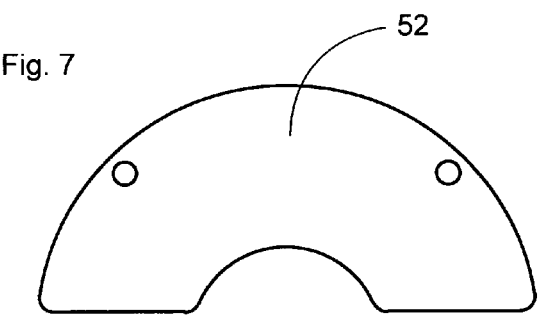
Fig. 7
Fig. 8
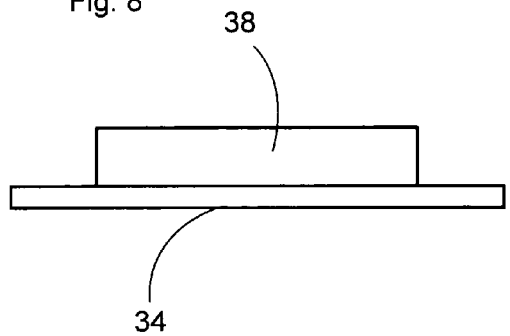
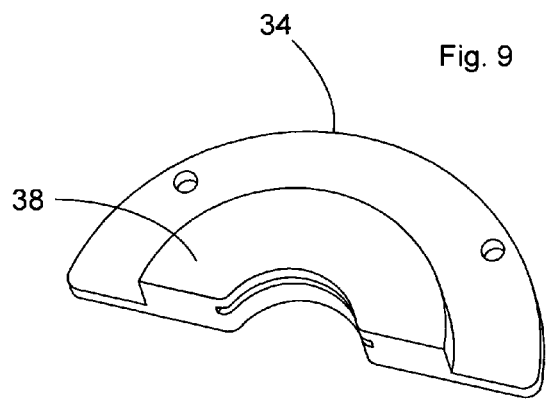
Fig. 9

CRYOGENIC FREEZING APPARATUS

BACKGROUND OF THE INVENTION (1) Field of the Invention

The present invention is directed to an improved pipe freezing apparatus for use in freezing a plug of liquid within a pipe to facilitate repair or replacement of a pipe section, and in particular to a pipe freezing apparatus that is readily adaptable for use with pipes of different diameters.

(2) Description of the Prior Art

Repairing or replacing sections of fluid carrying pipe historically required draining of the pipe, and then cutting and replacing the pipe section. This time consuming and expensive procedure has been largely replaced through the use of pipe freezing devices that freeze a plug of liquid inside the pipe upstream of the pipe section that is to be repaired or replaced. The frozen plug prevents liquid from flowing from the pipe during repair. After the repairs have been made, the plug is allowed to thaw so that liquid can again flow through the pipe.

Pipe freezing devices are comprised of a refrigerant chamber that is placed around or against the pipe section to be frozen. In one type of device, the chamber includes a concave wall section having a radius that corresponds to the radius of the pipe. When used, the chamber, which is of a temperature conductive material such as aluminum, is placed against the pipe.

In another type of freezing device, referred to herein as a pipe enclosure device, the chamber is comprised of two sections that are clamped together around the pipe. The resultant chamber has openings in each end with a cross-section corresponding to the cross-section of the pipe. The present invention relates generally to a pipe freezing apparatus of this type.

The freezing device also includes an inlet that can be connected to a source of a low-temperature liquid refrigerant, e.g., liquid $CO_2$ or nitrogen. The chamber also includes one or more exhaust ports, to which may be coupled a vent stack, normally on the opposite side of the chamber from the refrigerant inlet.

In use, the chamber is clamped around the pipe section with the pipe extending through the openings in the chamber. Refrigerant is then introduced, normally via a hose from a refrigerant source, into the chamber and allowed to evaporate, with the evaporated refrigerant escaping through one or more of the exhaust ports. As the refrigerant evaporates, heat is extracted from the pipe and fluid within the section of pipe enclosed by the chamber, resulting in freezing of the liquid within the section of pipe enclosed by the chamber.

The above pipe enclosure device is very effective in quickly freezing a plug of liquid within a pipe of a given diameter. However, pipes of different diameters are used in environments where there is a need to repair or replace a section of pipe. Therefore, it is often necessary for the repair person to carry pipe freezing devices with chambers having pipe openings sized for several different size pipes. As a result, the equipment is difficult to transport and costly.

There have been attempts to address the problem by using semi-circular chamber inserts that are fitted into radial slots in the chamber walls adjacent the chamber openings. However, these inserts are cumbersome, often falling out when placing the chamber sections around a pipe. Therefore, there is a need for a single pipe freezing chamber of the pipe enclosure type that can fit around pipes of different sizes without leakage of refrigerant from between the pipe outer wall and the chamber wall.

SUMMARY OF THE INVENTION

The present invention is directed to an improved pipe freezing apparatus for use in freezing a plug of liquid within a pipe to facilitate repair or replacement of a pipe section downstream of the plug without the need to drain liquid from the pipe before repairs. The invention relates especially to a pipe freezing apparatus that is readily adaptable for use with pipes of different diameters, eliminating the need for a different pipe freezing apparatus for each diameter pipe.

Generally, the pipe freezing apparatus of the present invention is comprised of first and second half cylindrical chamber sections with side edges and transverse end mounting walls that are placed on either side of the pipe around the section of pipe to be frozen, with the facing side edges being joined to form a cylindrical chamber with a space between the pipe and the interior of the chamber. When joined, the chamber sections combine to form a chamber with parallel end walls having outer plate mounting faces and pipe openings each having a diameter at least as large as the diameter of the largest pipe over which the chamber is to be fitted.

In order for the apparatus to be useful with pipes of different sizes, the apparatus also includes first and second pairs of adapter plates attachable to the end mounting walls of the chamber. Each adapter plate is comprised of a pair of adapter plate sections. Each adapter plate has an inner face attachable to an outer face of a chamber end wall, e.g., by bolts inserted through bores in the adapter plate sections and into threaded bores in the chamber section end wall. Each pair of plate sections forms an annular plate with a center opening coaxial with the opening on one end of the chamber, the plate opening having a cross-section substantially equal to the cross-section of the pipe.

A pipe freezing apparatus kit will include a plurality of sets of four adapter plates, each set forming two adapter plates, with the plates of each set having openings of a diameter different from the diameter of the openings in the plates of another set. By selecting the adapter plates having diameters corresponding to the diameter of the pipe to be frozen, the common chamber can be used, thereby significantly reducing the weight and cost.

In order to ensure a snug fit between the chamber sections, a first compressible gasket is positioned between the edges of the chamber sections and the edges of the adapter plate sections at each end of the chamber. When attaching the chamber sections around a pipe, compressible tape is also wrapped around the pipes at the peripheries of the adapter sections to provide a snug fit between the inner peripheries of the adapter sections and the pipe wall.

The chamber sections are held together by a clamp that can be tightened to press the chamber edges against the gasket, thereby forming a substantially leak free seal between the chamber edges. The clamp also serves to compress the second gaskets to provide a leak free seal at the ends of the freezing apparatus between the adapter plate sections and the pipe. In a preferred embodiment, the clamp is in the form of a flexible band that extends about the circumference of the two chamber sections, with the ends of the band being locked together by an adjustable locking member, e.g., an adjustable T-bolt. The band can also be in two sections, with the adjacent ends of the two sections being releasibly connected by T-bolts or other locking members.

One of the chamber sections includes an inlet that can be connected via a hose to a source of refrigerant, e.g., a tank of compressed nitrogen or $CO_2$. The other chamber section includes at least one exhaust port with an attachable vent stack to discharge the refrigerant gas from the chamber.

In use, adapter plates, each having an inner cutout with a radius of curvature corresponding to the radius of curvature of the pipe to be repaired are attached, e.g., bolted, to the end wall sections of the chamber sections. The chamber sections are positioned on opposite sides of the pipe above the area that is to be repaired with a compressible gasket being positioned between the cylinder sections. Compressible tape is also wrapped around the pipe at the ends of the chamber to prevent leakage between the adapter plates and the pipe. The gaskets and tape are made of a compressible material, such as a neoprene and ethylene propylene rubber blend, that does not become brittle at the freezing temperatures.

The cylinder sections are then clamped together to compress the gaskets, preventing leakage between the chamber sections, or the interfaces of the adapter plates with the pipe. Clamping may be effected with a band clamp comprised of two band sections, one section being attached to each cylinder section, and T-bolts to adjustably draw the band ends toward each other.

After the chamber sections are clamped together, a refrigerant, e.g., liquid nitrogen, is introduced into the interior of the chamber into contact with the pipe, extracting heat from the pipe and liquid within the pipe interior, creating a frozen plug inside the section of pipe covered by the chamber. Nitrogen gas is exhausted through the exhaust ports. The pipe downstream of the freezing apparatus can then be repaired. After repairing the pipe, the plug is allowed to melt so that liquid again flows through the pipe.

BRIEF DESCRIPTION OF THE DRAWINGS

FIG. 2 is a perspective top view of the upper chamber section.

FIG. 3 is a perspective bottom view of the upper chamber section.

FIG. 4 is a bottom view of the upper chamber section with adapter plate sections and gaskets attached.

FIG. 5 is an end view of the upper chamber section showing the mounting wall section.

FIG. 6 is an end view of the face of an adapter plate section sized for a pipe of a given diameter.

FIG. 7 is an end view of the face of another adapter plate section sized for a pipe having a larger diameter than that given diameter of the pipe of FIG. 6.

FIG. 8 is a top view of an adapter plate section.

FIG. 9 is a perspective view of the inner face of an adapter plate section showing the projecting shoulder.

DETAILED DESCRIPTION OF THE INVENTION

Figure 1:
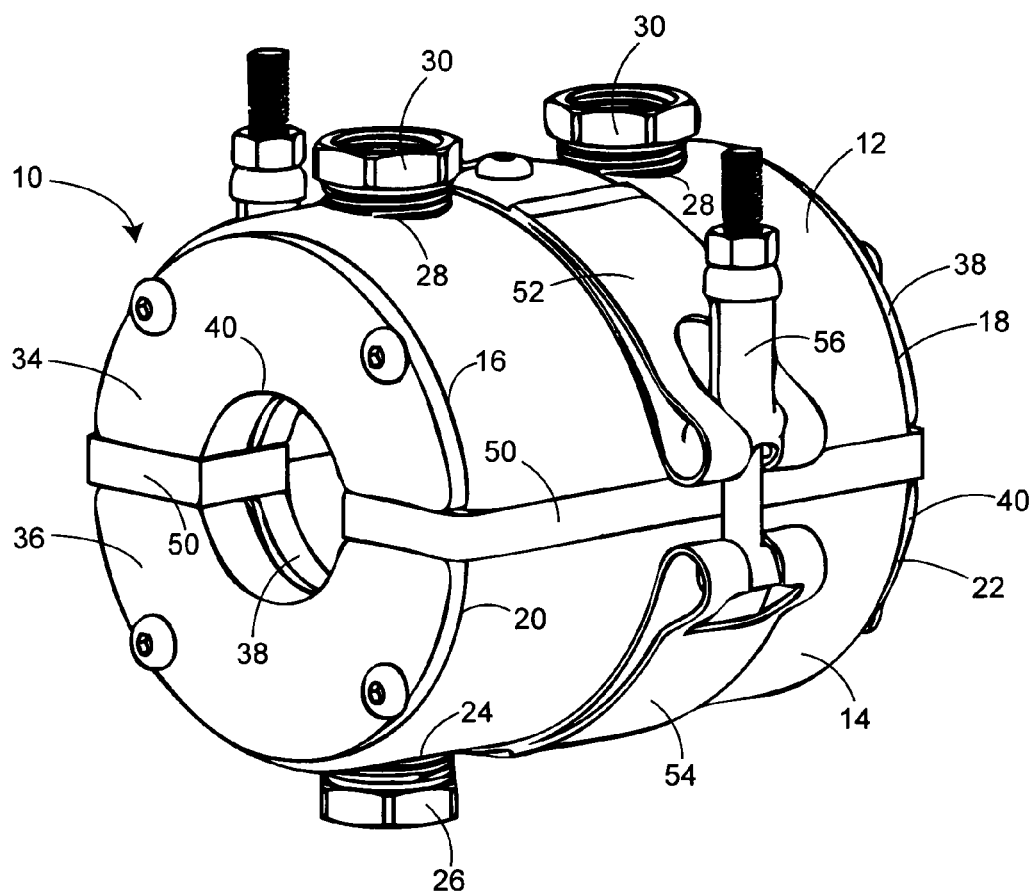
FIG. 1 is a perspective view of the cryogenic freezing apparatus.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The freezing device of the present invention, generally 10, is comprised of a first chamber section 12 mating with a second chamber section 14, which together form a chamber with a hollow interior and end walls with outer faces and circular pipe receiving openings. Chamber section 12 includes opposed, parallel end walls 16 and 18 transverse to the axis of the chamber. Similarly, chamber section 14 includes opposed, parallel end walls 20 and 22 transverse to the axis of the chamber. Each wall includes spaced, threaded bolt holes. Chamber 12 includes an inlet 24 with a threaded bushing 26 for attachment of a supply hose, not shown, from a refrigerant supply source, not shown. Chamber 14 includes a pair of exhaust ports 28 with threaded bushings 30 to attach a vent stack 32.

When the chamber sections are joined to form a chamber, the end wall sections at each end of the chamber lie in a common plane and form annular end walls having central openings. A first pair of adapter plate sections 34 and 36 are mounted onto the end wall 16 and end wall 20, respectively, and together form an annular plate having dimensions corresponding the chamber end wall, except that the diameter of the central circular opening of the adapter plate is less than the diameter of the central opening of the pipe opening in the end of the chamber. Adapter plate sections 38 and 40 are identical, with each plate section including a shoulder 42 with a radius of curvature corresponding to the radius of curvature of the periphery of the inner wall of the chamber pipe opening and a semi-circular cutout 44 with a radius of curvature corresponding the radius of curvature of the pipe to be enclosed.

Freezing device 10 also includes a pair of U-shaped compressible gasket sections 50 that fit between the adjacent edges of chamber sections 12 and 14, and the adjacent edges of each pair of adapter plate sections, e.g., plate sections 30 and 32. Freezing device 10 also includes a clamp to clamp sections 12 and 14 with gasket sections 50 positioned between the chamber sections being compressed upon clamping to provide a refrigerant tight seal between sections 12 and 14, and each pair of adapter plate sections.

Chamber sections 12 and 14 are preferably clamped together by a pair of band sections 52 and 54 attached to chamber sections 12 and 14, respectively. Each band section 52 and 54 includes looped ends, with adjacent band section ends being joined by T-bolts 56, which are tightened to clamp chamber sections 12 and 14 against gasket sections 50.

Figure 10:
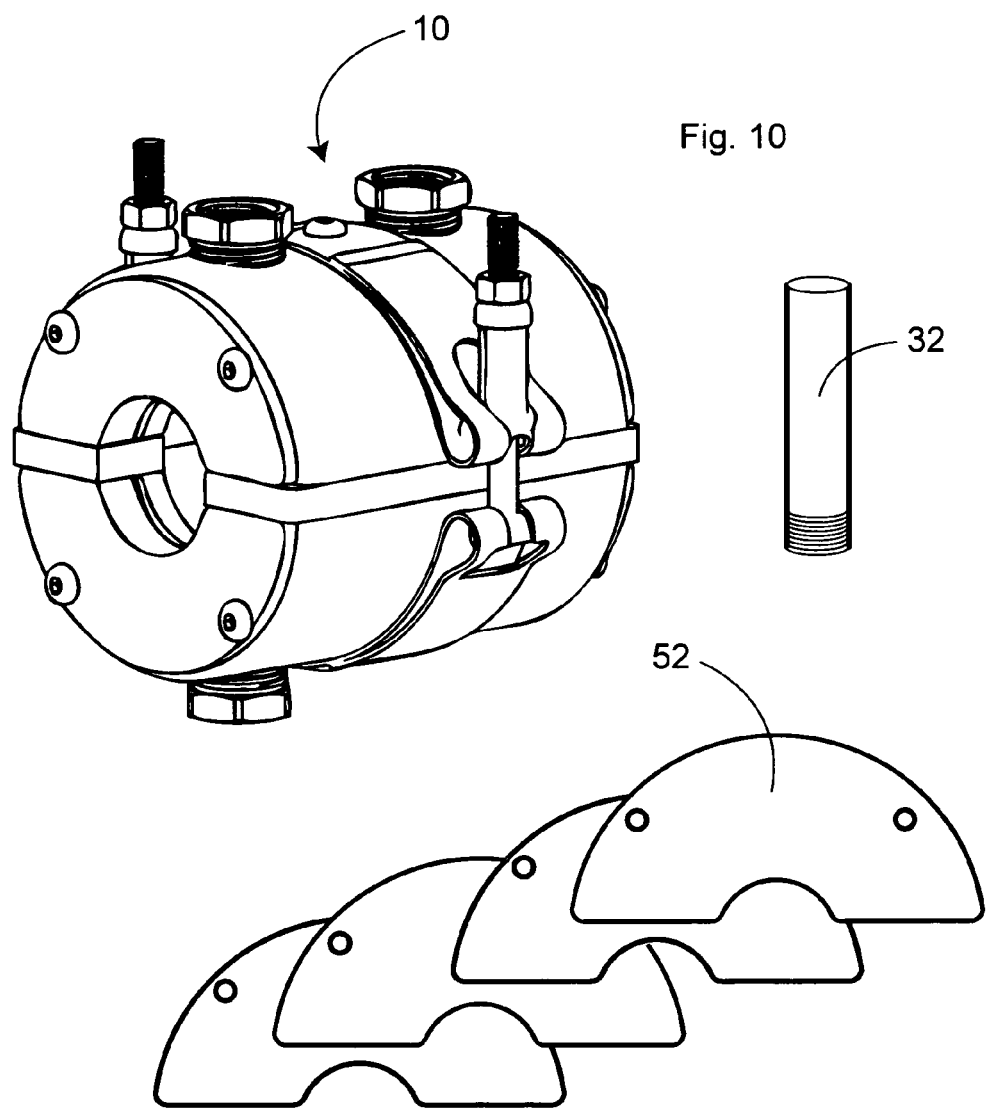
FIG. 10 is an illustration of a kit for use with pipes of different diameters, including a fully assembled freezing apparatus for a pipe of a given diameter, a vent stack and a set of four adapter plate sections for use with a pipe having a diameter different from the given diameter.

The freezing device may be in the form of a kit as illustrated in FIG. 10, enabling the user to freeze sections of pipes having at two different diameters. Each kit is comprised of the components required to assemble a complete freezing apparatus as illustrated in FIG. 1 for use in freezing a pipe of a given diameter, the assembly including four first adapter plate sections for forming two first adapter plates with central openings corresponding to the cross-section of a first pipe having a given diameter. The kit also includes a second adapter plate set including four second adapter plate sections 52, with each pair of second adapter plate sections forming a second adapter plate with a central opening corresponding to the cross-section of a second pipe having a diameter different from the given diameter of the first pipe. The kit may also include additional U-shaped gaskets and a vent stack. It will be understood that the kit may also include additional adapter plate sets so that the kit can be used to freeze pipes of other diameters.

When freezing a pipe of a given diameter, adapter plate sections having semi-circular cutouts on their inner edges which together form a circle having a diameter corresponding to the pipe diameter are selected. The adapter plates are then bolted to the ends of the chamber sections. A U-shaped gasket is then attached to each side of one of the chamber sections, with the arms of the "U" extending across end mounting plates and the inner edges of the adapter plate section on either side of the semi-circular cutout. Compressible tape is then wrapped around the pipe at spaced locations corresponding to the spacing of the adapter plates.

One chamber section is then placed on either side of the pipe with the adapter plate sections over the wrapping tape, and the chamber sections are clamped together using the band sections and T-bolt clamps. A refrigerant supply hose is attached to one of the chamber sections, while a vent stack is attached to an exhaust port on the other chamber section. Refrigerant is then introduced into the chamber formed by the chamber sections. The refrigerant, while extracting heat from the pipe and liquid within the pipe, is exhausted through the vent stack as a gas. Continual refrigerant flow causes the pipe and liquid inside the pipe to freeze, creating a blocking plug inside the pipe.

Once the plug is formed, the pipe can be repaired downstream of the freezing device. After repair, the freezing device is removed from the pipe and the plug is allowed to thaw, allowing flow of liquid through the pipe to resume.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A pipe freezing apparatus mountable around a pipe having a given diameter for use in freezing a plug of liquid within the pipe comprising:
    a) a multi-section chamber attachable attached around said pipe, said chamber having opposed annular end walls with outer faces and pipe openings having diameters greater than the pipe given diameter; and
    b) a pair of multi-section adapter plates detachably attached to the outer faces of the end walls of said chamber, said adapter plates having central pipe receiving opening.

2. The pipe freezing apparatus of claim 1, wherein said chamber is cylindrical.

3. The pipe freezing apparatus of claim 1, wherein said chamber is formed of two chamber sections, one of said chamber sections includes a refrigerant inlet and the other of said chamber sections includes a refrigerant outlet.

4. The pipe freezing apparatus of claim 1, further including a compressible gasket inserted between said chamber sections.

5. The pipe freezing apparatus of claim 1, wherein each of said adapter plates is comprised of two sections with adjacent edges having semi-circular cutouts, said cutouts forming a pipe receiving opening.

6. The pipe freezing apparatus of claim 1, wherein said adapter plates include inner shoulders extending into said chamber end openings.

7. The pipe freezing apparatus of claim 1, wherein said multi-section adapter plates are bolted to said chamber end walls.

8. The pipe freezing apparatus of claim 1, further including a clamp to clamp said chamber sections around said pipe.

9. The pipe freezing apparatus of claim 1, further including a second pair of multi-section second adapter plates attachable to the end walls of said chamber, said second adapter plates having central pipe receiving opening with a diameter different from said given diameter.

10. A pipe freezing apparatus mountable around a pipe for use in freezing a plug of liquid within the pipe comprising:
    a) first and second half chamber sections sized to form a chamber when joined together, each section having side edges and end mounting walls with an inner edge having a semi-circular cutout with a radius of curvature greater than the radius of curvature of said pipe;
    b) first adapter plate sections detachably attached to the end mounting flanges of said first chamber section;
    c) second adapter plate sections detachably attached to the end mounting walls of said second chamber section, said first and second adapter plate sections each having inner edges with a semi-circular cutout having a radius of curvature corresponding to the radius of curvature of said pipe and forming annular plates with a center opening having a cross-section substantially equal to the cross-section of said pipe when said chamber sections are joined; d) a compressible gasket inserted between the side edges of said chamber sections and the inner edges of said adapter plate sections; and e) a clamp to clamp said chamber sections against opposite sides of said gasket and around said pipe.

11. The pipe freezing apparatus of claim 10, wherein said chamber is cylindrical.

12. The pipe freezing apparatus of claim 10, wherein said clamp is a T-bolt band clamp.

13. The pipe freezing apparatus of claim 10, wherein said first compressible gasket is formed from a neoprene and ethylene propylene rubber blend.

14. The pipe freezing apparatus of claim 10, wherein adapter plate section cutouts include grooved inner faces.

15. The pipe freezing apparatus of claim 10, wherein said adapter plate sections include inner shoulder projections inserted into the mounting flange cutouts.

16. A kit for use in freezing liquid within a first pipe of a given first diameter and a second pipe of a given second diameter less than said given first diameter comprising:
    a) a chamber adapted for attachment around a pipe and receiving a refrigerant, said chamber having opposed end mounting walls with openings having a diameter greater than said first given diameter and being formed of mating chamber sections;
    b) a pair of first adapter plates detachably attached to the end walls of said chamber sections, said first adapter plates having inner faces mounted against the outer faces of said chamber end walls and central pipe receiving openings with a diameter equal to said first given diameter; and
    c) a pair of second adapter plates having inner faces detachably attached to the outer faces of said chamber end walls and central pipe receiving opening with a diameter equal to said second given diameter.

17. The pipe freezing apparatus of claim 16, further including a compressible gasket inserted between said chamber sections.

18. The pipe freezing apparatus of claim 16, wherein each of said adapter plates is comprised of two sections with adjacent edges having semi-circular cutouts, said cutouts forming a pipe receiving opening.

19. The pipe freezing apparatus of claim 16, wherein said chamber is cylindrical.

20. The pipe freezing apparatus of claim 16, further including a clamping means to clamp said chamber sections around said pipe, said clamping means being comprised of a first and second band sections extending around the circumference of said cylinder, the ends of said bands being attached to each other by T-bolt clamps.

* * * * *